United States Patent [19]
Inami et al.

[11] Patent Number: 5,625,530
[45] Date of Patent: Apr. 29, 1997

[54] GAS INSULATED SWITCHGEAR EQUIPMENT INCLUDING A BYPASS BUS AND BYPASS DISCONNECTING SWITCH

[75] Inventors: Yoshiaki Inami; Takahide Seki; Toyokazu Tanaka; Masafumi Ooshima, all of Hitachi, Japan

[73] Assignee: Hitachi, Ltd., Tokyo, Japan

[21] Appl. No.: 520,295

[22] Filed: Aug. 28, 1995

[30]  Foreign Application Priority Data

Aug. 31, 1994  [JP]  Japan .................................. 6-206334

[51] Int. Cl.⁶ .................................................. H02B 1/04
[52] U.S. Cl. ........................................... 361/604; 361/618
[58] Field of Search ..................... 361/602, 603, 361/604, 605, 611, 612, 618, 620, 836; 218/4, 45, 68, 55, 75, 69, 79, 80, 152, 153; 307/112, 113, 147, 148

[56]  References Cited

U.S. PATENT DOCUMENTS

| | | | |
|---|---|---|---|
| 4,241,379 | 12/1980 | Olsen | 361/335 |
| 4,503,481 | 3/1985 | Fujiya | 361/604 |
| 4,866,569 | 9/1989 | Okumura | 361/335 |
| 5,210,679 | 5/1993 | Takamoto | 361/335 |
| 5,484,972 | 1/1996 | Tecchio | 218/70 |

FOREIGN PATENT DOCUMENTS 1-248911  10/1989  Japan .
1-303002  12/1989  Japan .

Primary Examiner—Gerald P. Tolin
Attorney, Agent, or Firm—Fay, Sharpe, Beall, Fagan, Minnich & McKee

[57]  ABSTRACT

A power receiving unit is arranged in one side of an instrument potential/current unit transformer. A transformer-side unit is arranged in the other side of the instrument potential/current transformer units. A bypass bus connecting the power receiving unit and the transformer-side unit is arranged in parallel to the row of cubicles. The gas insulated switchgear can be made small in size and the work for adding a bank can be performed with substantially small man-power. The size of the gas insulated switchgear can be also prevented from increasing due to the addition of a bank.

5 Claims, 14 Drawing Sheets

GAS INSULATED SWITCHGEAR EQUIPMENT INCLUDING A BYPASS BUS AND BYPASS DISCONNECTING SWITCH

BACKGROUND OF THE INVENTION

The present invention relates to a gas insulated switchgear for a private-use high voltage power receiving/transforming apparatus.

As to conventional gas insulating switchgears for private-use high voltage power receiving/transforming apparatus, two types, referred to as one-measuring-circuit type and two-measuring-circuit type, are known according to the difference in the method of measuring the amount of consumed electric power. The former type has a construction in which electric power is received with two lines and led to two transformers through one instrument potential/current transformer as described in Japanese Patent Application Laid-Open No. 1-303002 (1989). Therefore, although the reliability of electric power supply is improved with the double-receiving circuit, the electric line should be completely shut down at the time when the instrument potential/current transformer is inspected or replaced. On the contrary, the latter type has two instrument potential/current transformers as described in Japanese Patent Application Laid-Open No. 1-248911 (1989), and when one of the instrument potential/current transformers is inspected, the consuming electric power is measured using the other instrument potential/current transformer to avoid the complete power outage.

However, in a case where two instrument potential/current transformers are used, there arise problems due to the increase in the size of the gas insulated switchgear, and the increase in work for inspection and maintenance of the instrument potential/current transformers. Therefore, there is proposed a bypass disconnecting switch type where one of the two instrument potential/current transformers in the two-measuring-circuit type is replaced with a bypass disconnecting switch. That is, as shown in FIG. 17, an instrument potential/current transformer 13 and a bypass disconnecting switch 32 are connected in parallel, and when the instrument potential/current transformer is inspected or replaced, the bypass disconnecting switch 32 is connected to continue operation. The amount of consumed electric power during the time is determined by performance figures in the past to avoid the complete power outage.

By employing the bypass disconnecting switch type using one instrument potential/current transformer, inspection and replacement of the instrument potential/current transformer can be performed without power outage as described above.

FIG. 18 is a plan view of the private-use high voltage power receiving apparatus of FIG. 17 which is constructed based on a conventional technology. In this figure, a closed loop composed of an instrument potential/current transformer unit 13 and a bypass disconnecting switch 32 is constructed on a plane, which makes the size of the gas insulated switchgear large. On the other hand, in the gas insulated switchgear shown in FIG. 20, a closed loop composed of an instrument potential/current transformer unit 13 and a bypass disconnecting switch 32 is three-dimensionally constructed in two stages, upper and lower stages, to enable decreasing the size of the gas insulated switchgear. However, when an additional transformer-side unit is added by adding a bank in this construction, it is difficult to add the bank since the existing transformer-side unit is arranged in the inner side of the power receiving unit and the power receiving unit interferes the connection between the added transformer-side unit and the existing transformer-side unit.

SUMMARY OF THE INVENTION

An object of the present invention is to provide a gas insulated switchgear which has a small installing area and is capable of coping with adding of a bank easily.

The object of the present invention can be attained by providing a gas insulated switchgear having an instrument potential/current transformer unit, power receiving units, transformer-side units and buses connecting among the units. The units are each constructed in a row of cubicles in front of the gas insulated switchgear. The power receiving units are arranged in one side of the instrument potential/current transformer unit. The transformer-side units are arranged in the other side of the instrument potential/current transformer unit. The instrument potential/current transformer unit and the power receiving units are connected with a bus. The instrument potential/current transformer unit and the transformer-side units are connected with a bus, the power receiving units and the transformer-side units are connected with a bypass bus arranged in parallel to the row of cubicles.

In the gas insulated switchgear according to the present invention, as described above, the power receiving units are arranged in one side of the instrument potential/current transformer unit, the transformer-side units are arranged in the other side of the instrument potential/current transformer unit, and the power receiving units and the transformer-side units are connected with a bypass bus arranged in parallel to the row of cubicles. Therefore, the installing area of the gas insulated switchgear can be decreased and the construction of the gas insulated switchgear can be made compact.

By arranging the power receiving units in one side of the instrument potential/current transformer unit and arranging the transformer-side units in the other side of the instrument potential/current transformer unit, an additional transformer-side unit can be installed in the outside of the existing transformer-side unit as in an equivalent manner to when a bank is added. Therefore, the work for addition can be performed with small man-power and increase in size of the gas insulated switchgear due to addition can be suppressed.

BRIEF DESCRIPTION OF THE DRAWINGS

FIG. 20 is a plan view of the private-use high voltage power receiving apparatus of FIG. 17 the size of which is decreased based on a conventional technology.

DETAILED DESCRIPTION OF PREFERRED EMBODIMENTS

The present invention will be described below, referring to the accompanying drawings.

Figure 2:
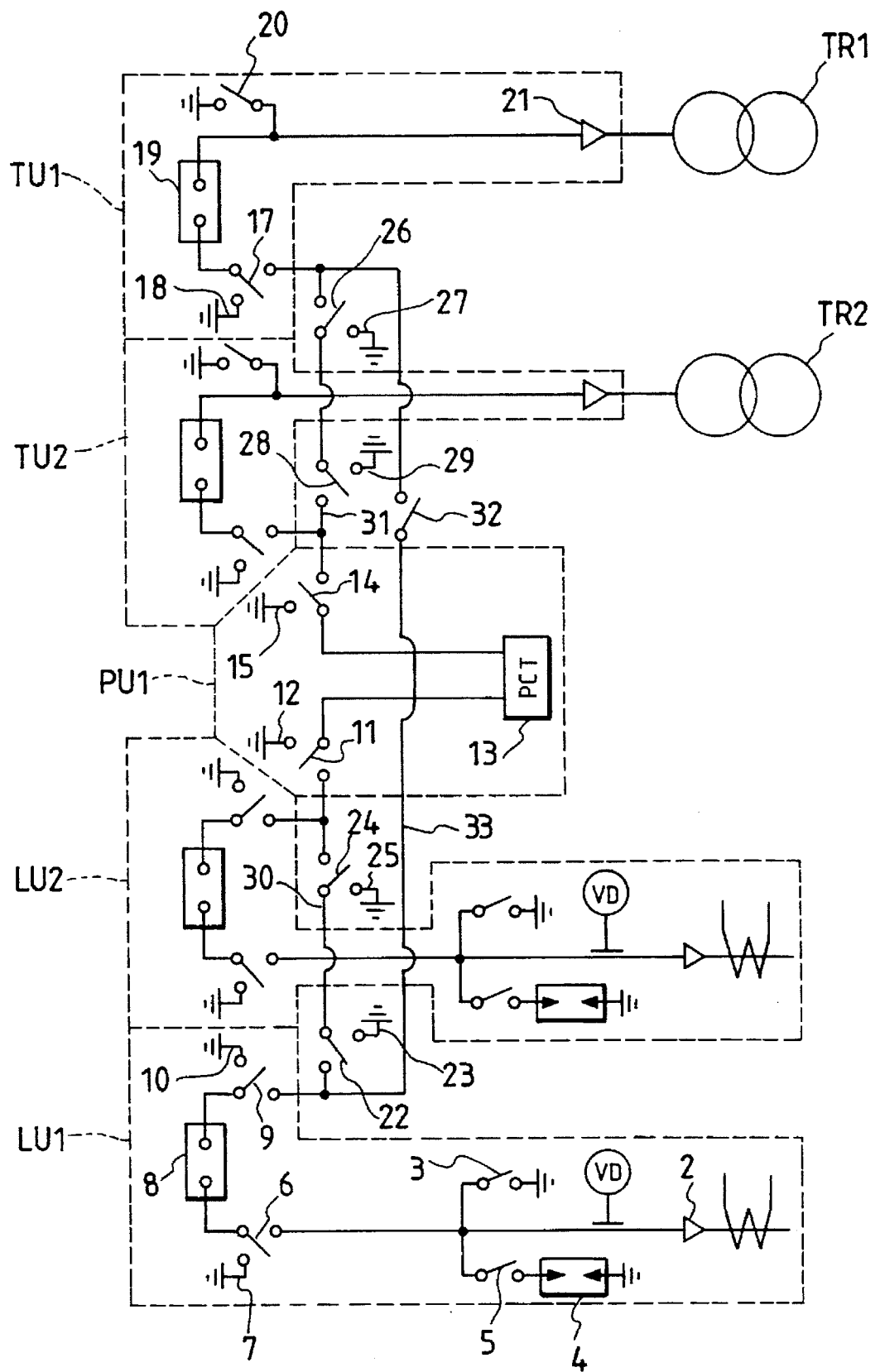
FIG. 2 is a single-line circuit diagram corresponding to the construction of the gas insulated switchgear shown in FIG. 1.
Figure 17:
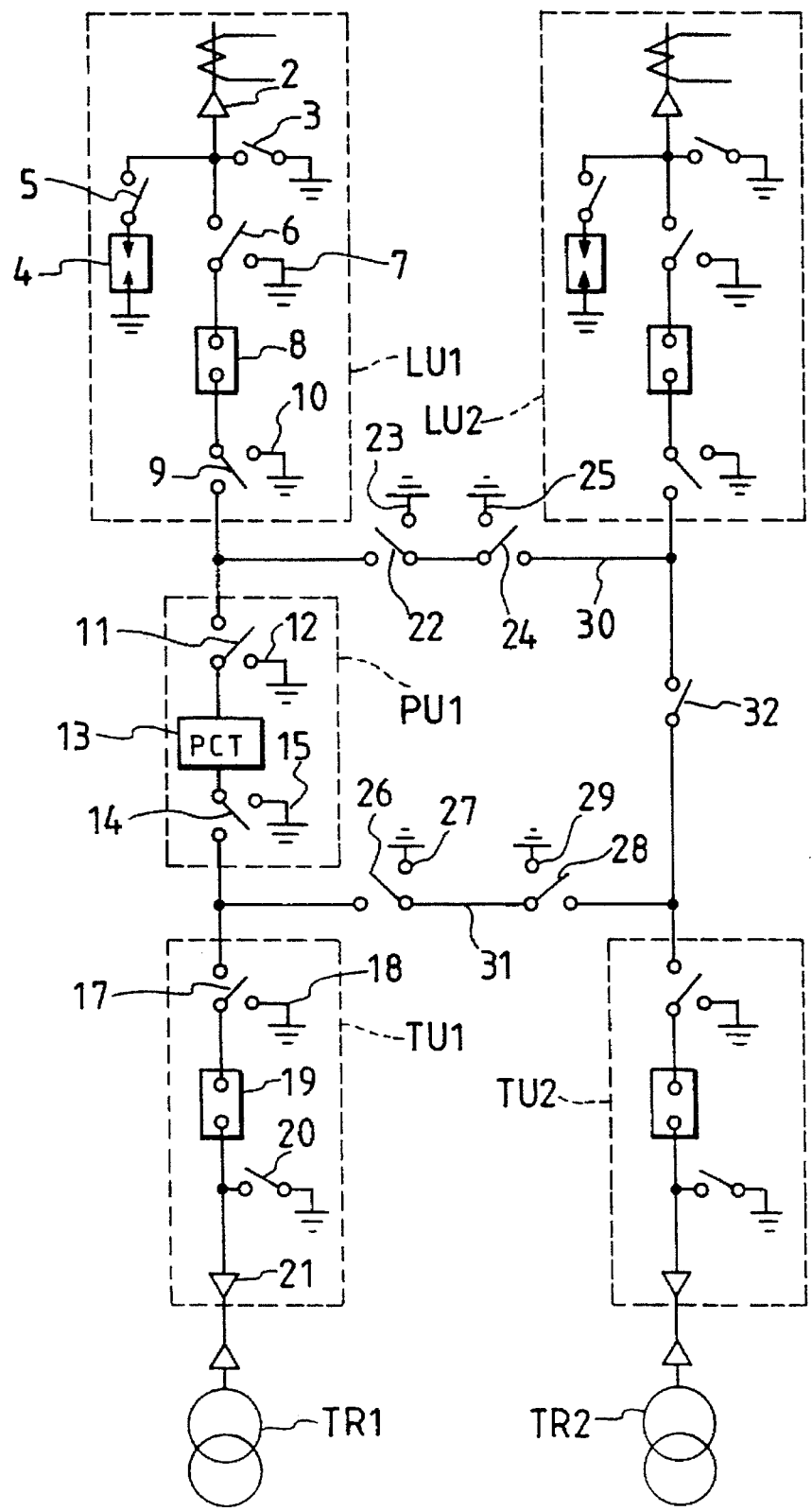
FIG. 17 is a single-line circuit diagram of a private-use high voltage power receiving apparatus of double-receiving-circuit, double-bank and bypass-disconnecting type.
Figure 18:
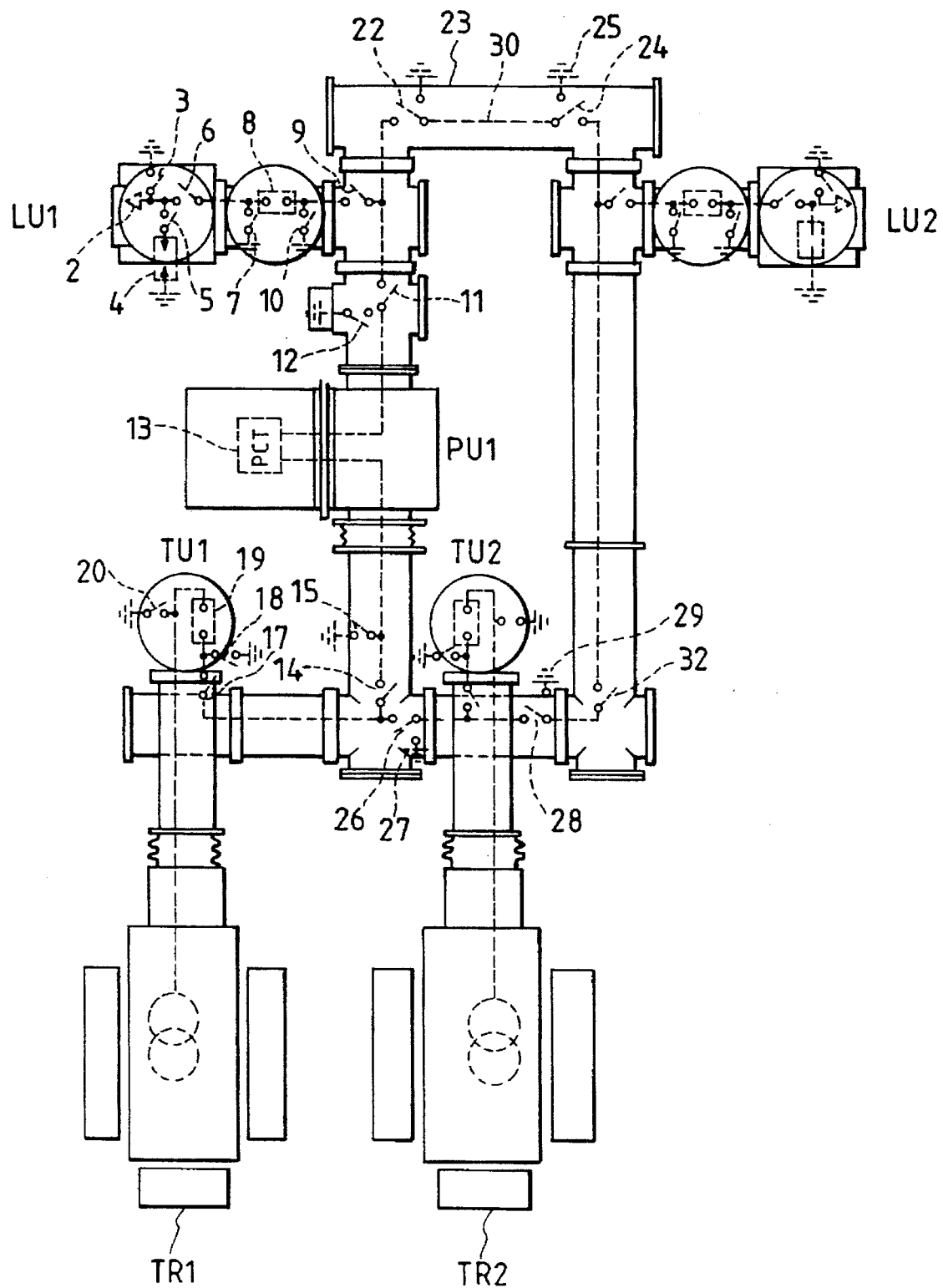
FIG. 18 is a plan view of the private-use high voltage power receiving apparatus of FIG. 17 which is constructed based on a conventional technology.
Figure 19:
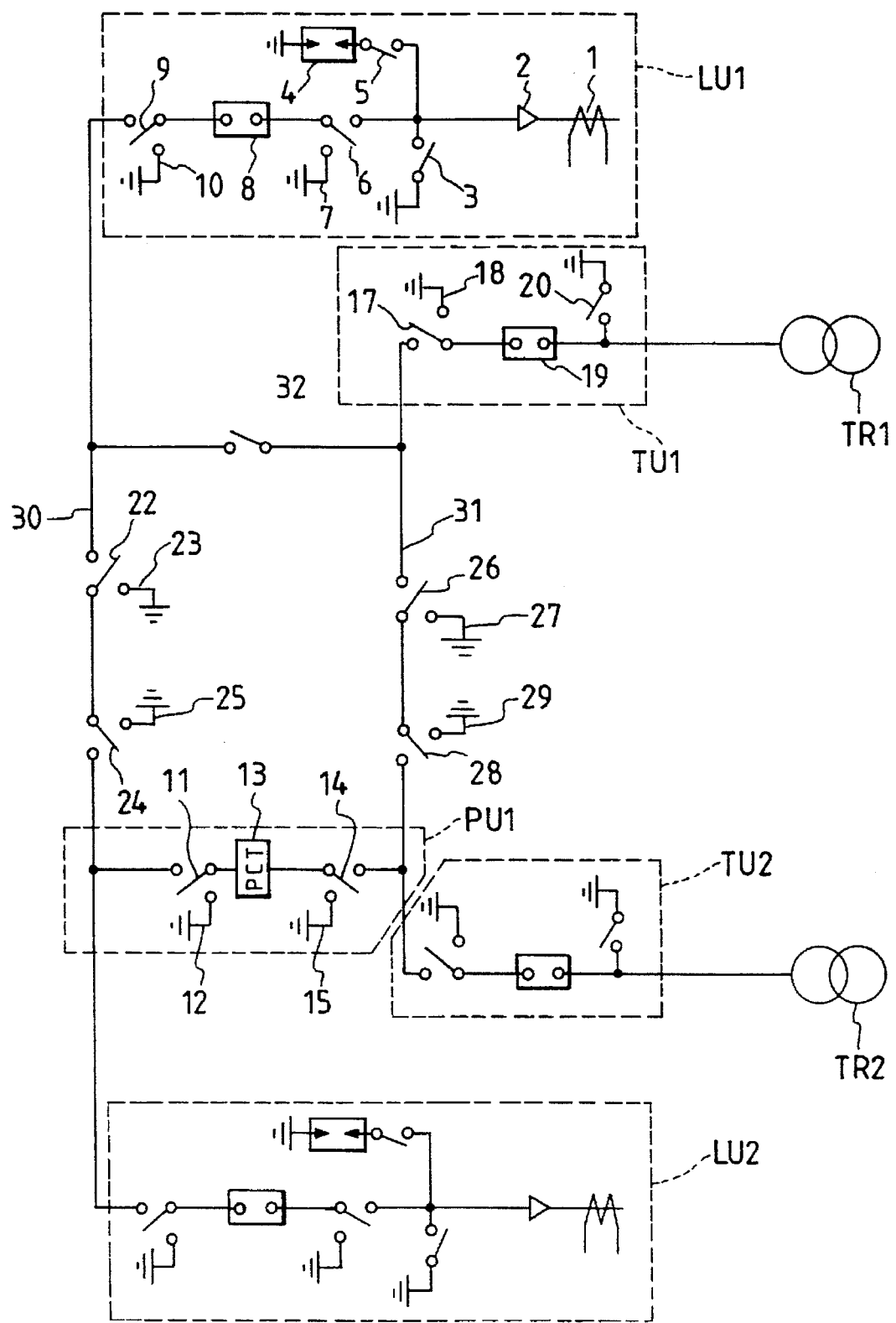
FIG. 19 is a single-line circuit diagram of the private-use high voltage power receiving apparatus of FIG. 17 which is re-drawn according to the arrangement of FIG. 20.

FIG. 17 is a single-line circuit diagram of a private-use high voltage power receiving apparatus of double-power-receiving-circuit, bypass-disconnecting and double-bank type, and FIG. 2 is a single-line circuit diagram of a private-use high voltage power receiving/transforming apparatus which is re-drawn according to the arrangement of the gas insulated switchgear constructed according to an embodiment of the present invention. Two sets of power receiving units LU1, LU2 and two sets of transformer-side units TU1, TU2 are constructed with the same components respectively. Therefore, each of the sets is explained in conjunction with one of the units.

The power receiving unit LU1 is of an incoming cable case. A main circuit conductor led-in with a cable head 2 through a current transformer 1 is connected to one end of a circuit breaker 8, and the other end of the circuit breaker 8 is connected to a disconnecting switch 9. One end of a earthing switch 3 earthed in the other end and one end of an arrester 4 earthed in the other end through an arrester isolating switch 5 are connected between the cable head 2 and the disconnecting switch 6. Earthing switches 7, 10 are connected to the circuit breaker side of the disconnecting switches 6, 9 respectively. In the measurement potential/current transformer unit PU1, both ends of a measurement potential/current transformer 13 are connected to disconnecting switches 11, 14 and one ends of earthing switches 12, 15 earthed in the other ends respectively. In the transformer-side unit TU1, one end of a disconnecting switch 19 is connected to a disconnecting switch 17 and one end of an earthing switch 18 earthed in the other end, and the other end of the disconnecting switch 19 is connected to one end of an earthing switch 20 earthed in the other end and is connected to a transformer TR1 through a cable head 21.

The transformer-side ends of the both power receiving units LU1, LU2 are connected to disconnecting switches 22, 24 and a connecting conductor 30 having earthing switches 23, 25 earthed in one ends to connect to the instrument potential/current transformer unit PU1. The power-receiving-unit-side ends of the both transformer-side unit TU1, TU2 are connected to disconnecting switches 26, 28 and a connecting conductor 31 having earthing switches 27, 29 earthed in one end to connect to the instrument potential/current transformer unit PU1. The power receiving units LU1, LU2 and the transformer-side unit TU1, TU2 are connected with a bypass bus 33 having a bypass disconnecting switch 32.

Figure 1:
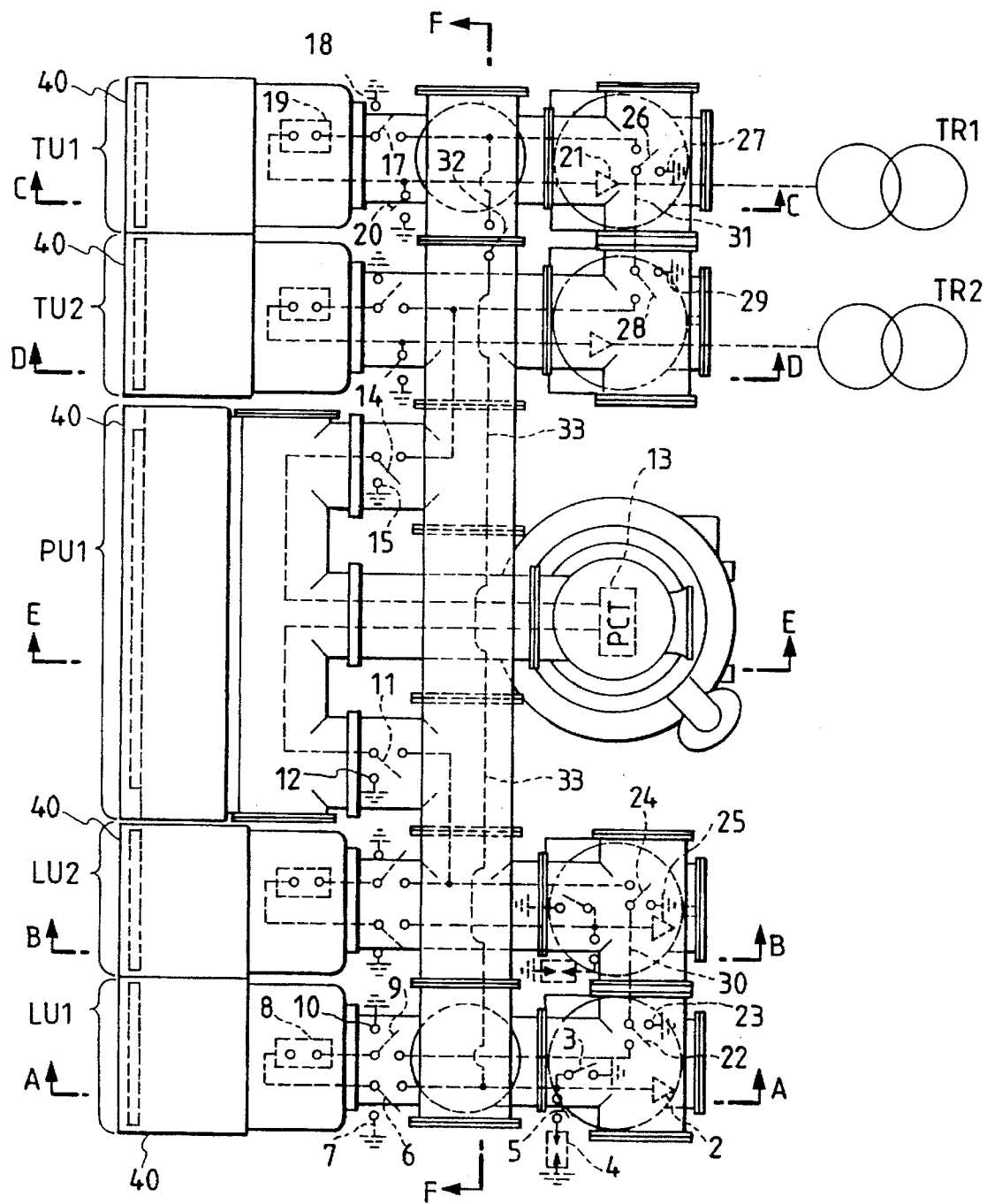
FIG. 1 is a plan view showing an embodiment of a gas insulated switchgear in accordance with the present invention.

FIG. 1 is a plan view showing an embodiment of a gas insulated switchgear in accordance with the present invention expressed by the single-line circuit diagram of FIG. 1. The instrument potential/current transformer unit PU1 is installed in the middle portion, and the power receiving units LU1, LU2 are installed in one side of the instrument potential/current transformer unit PU1 and the transformer-side units TU1, TU2 are installed in the other side opposite to the power receiving units LU1, LU2. The cubicles 40 containing the above units are installed in front of the gas insulated switchgear in a row, and the bypass bus 33 is placed in the upper stage of the gas insulated switchgear in parallel to the direction of the row of cubicles.

Figure 20:
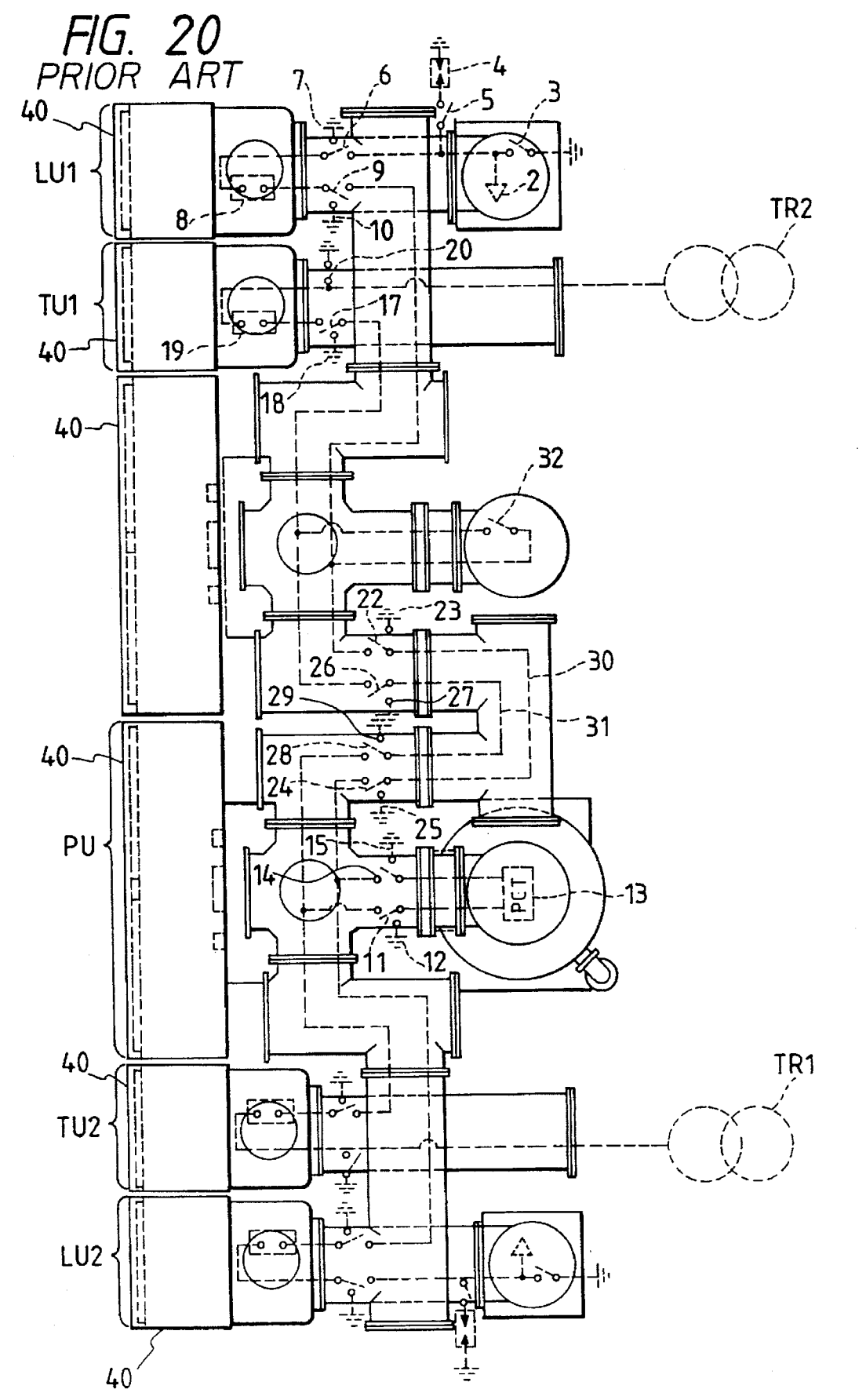

In this figure, the disconnecting switches 22, 24, 26, 28 are placed in different positions from the positions in the conventional apparatus of FIG. 20. In the conventional apparatus, since the disconnecting switches 22, 24, 26, 28 are arranged in a direction parallel to the row of cubicles, the length of the row becomes longer. On the other hand, according to the present invention, the length in the direction parallel to the row of cubicles can be shortened by placing the disconnecting switches 22, 24, 26, 28 in the connecting portions of the transformer-side units TU1, TU2 and the transformers TR1, TR2 and in the terminal portions of the power receiving units LU1, LU2.

Figure 3:
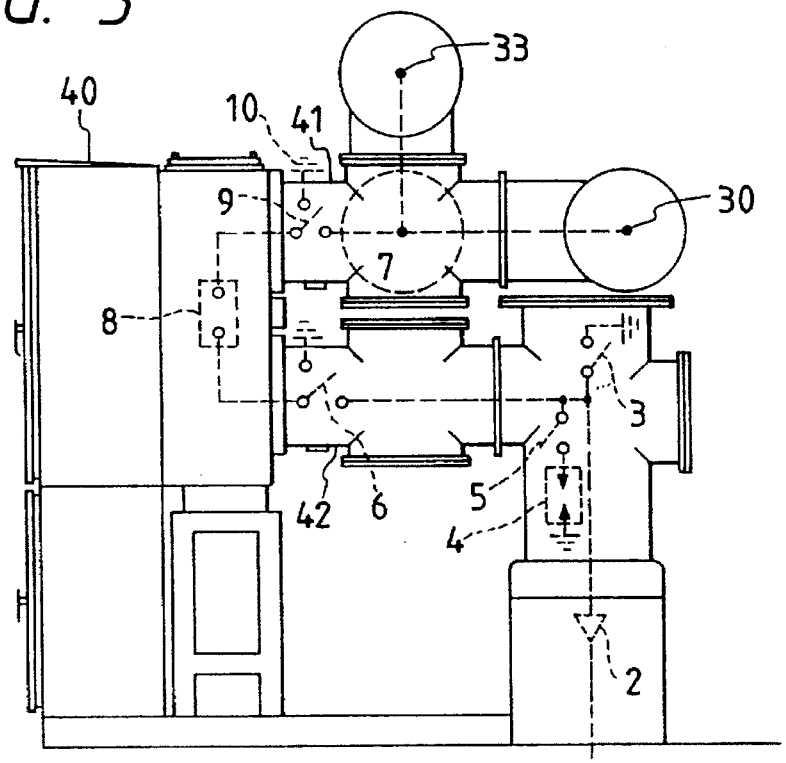
FIG. 3 is a view being taken on the plane of the line A—A of FIG. 1.
Figure 4:
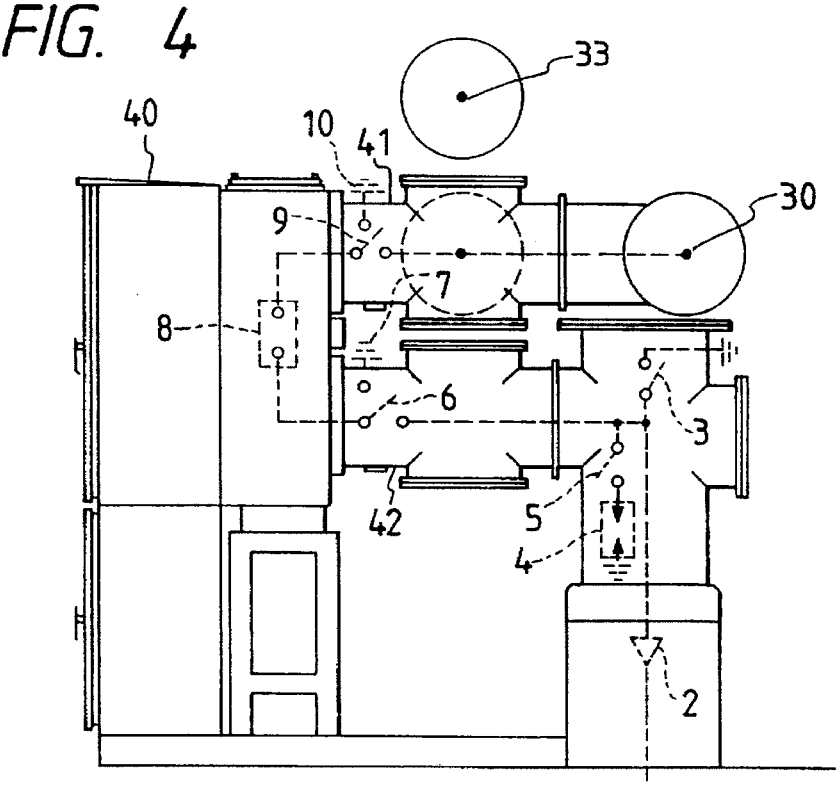
FIG. 4 is a view being taken on the plane of the line B—B of FIG. 1.

FIG. 3 and FIG. 4 are side views showing the power receiving units LU1, LU2 being taken on the plane of the lines A—A and B—B of FIG. 1, respectively. A set of lead terminals 41, 42, upper and lower terminals, are provided in the opposite side of a cubicle for the disconnecting switch 8 placed in the back of a cubicle 40, and the lead terminal 41 provided upper side is connected to the connecting conductor 30 which is connected between both power receiving units LU1, LU2 through the disconnecting switch 9 having the earthing switch 10. The lead terminal 42 provided lower side is connected to the disconnecting switch 6 with the earthing switch 7, the arrester 4 with the arrester isolating switch 5 and the cable head 2 through the earthing switch 3. The bypass bus 33 is arranged above both power receiving units LU1, LU2. In the power receiving unit LU1, the lead terminal 41 and the bypass bus 33 are connected as shown in FIG. 3.

According to the present invention, since the bypass bus can be arranged in a line parallel to the row of cubicles, the bus can be made short in length and efficient in use.

Figure 5:
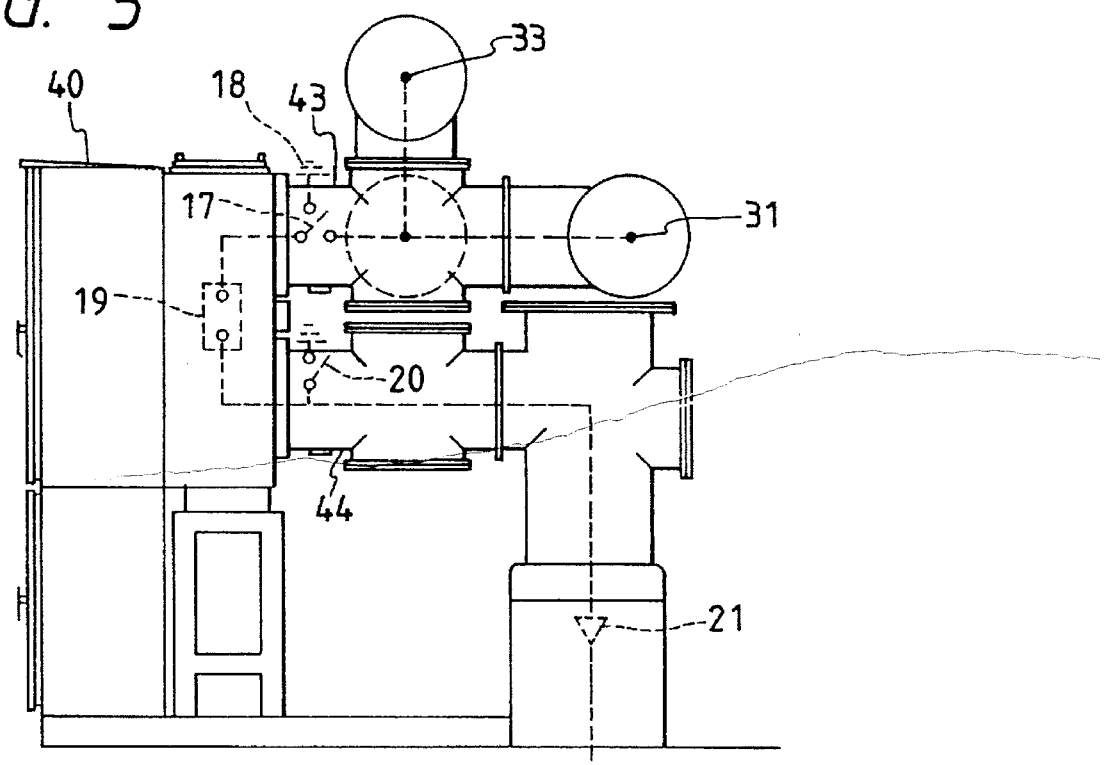
FIG. 5 is a view being taken on the plane of the line C—C of FIG. 1.
Figure 6:
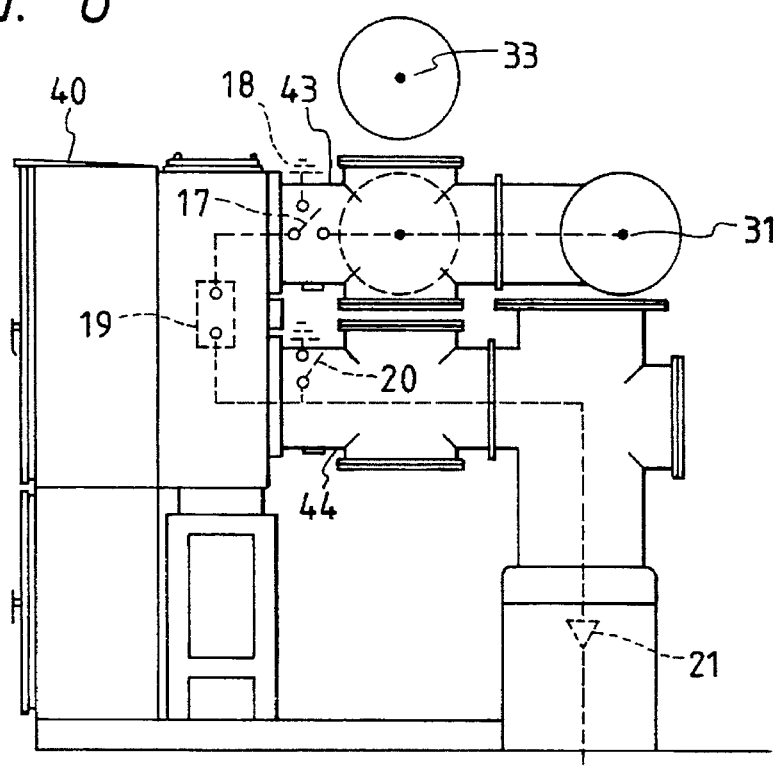
FIG. 6 is a view being taken on the plane of the line D—D of FIG. 1.

FIG. 5 and FIG. 6 are side views showing the transformer-side units TU1, TU2 being taken on the plane of the lines C—C and D—D of FIG. 1, respectively. A set of lead terminals 43, 44, upper and lower terminals, are provided in the opposite side of a cubicle for the disconnecting switch 19 placed in the back of a cubicle 40, and the lead terminal 43 provided upper side is connected to the connecting conductor 31 which is connected between the both transformer-side units TU1, TU2 through the disconnecting switch 17 having the earthing switch 18. The lead terminal 44 provided on the lower side is connected to the cable head 21 through the earthing switch 20. The bypass bus 33 is arranged above the both transformer-side units TU1, TU2. In the transformer-side unit TU1, the lead terminal 43 and the bypass bus 33 are connected as shown in FIG. 5.

Figure 7:
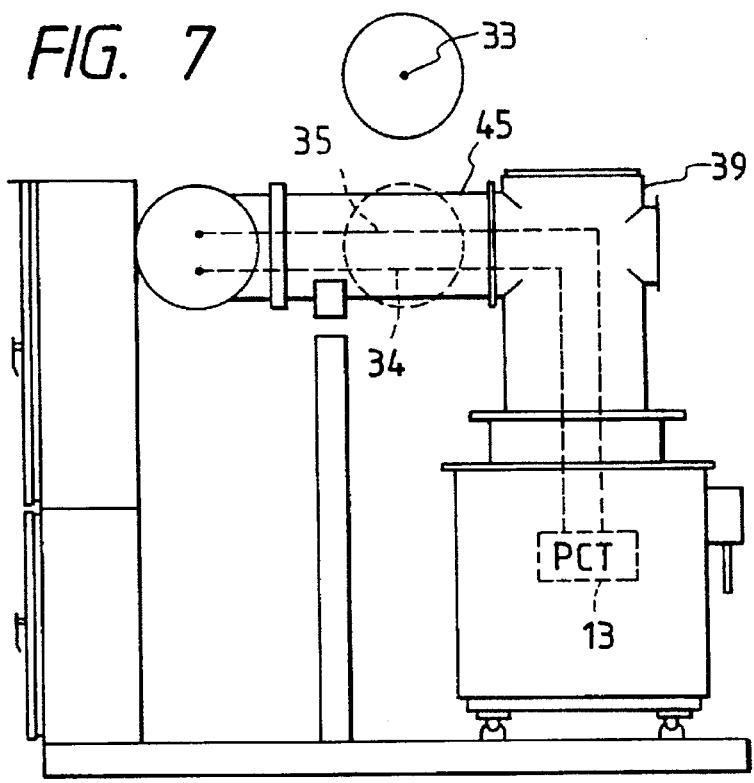
FIG. 7 is a view being taken on the plane of the line E—E of FIG. 1.

FIG. 7 is a side view showing the instrument potential/current transformer unit PU1 being taken on the plane of the line E—E of FIG. 1. The instrument potential/current transformer 13 is provided with a lead terminal 45 in the cubicle side through an adapter 39, and connected to the disconnecting switch 11 with the earthing switch 12 and the disconnecting switch 14 with the earthing switch 15 through the connecting conductors 34 and 35 respectively. The bypass bus 33 is arranged above the instrument potential/current transformer unit PU1.

Figure 8:
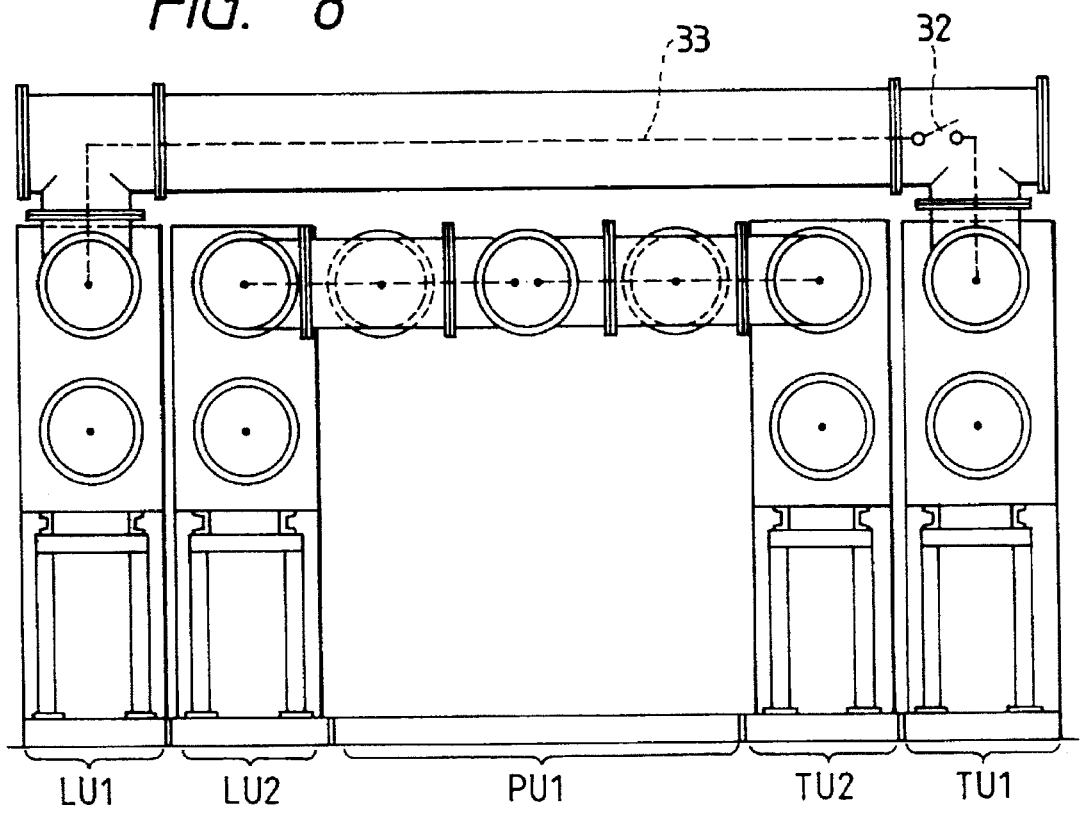
FIG. 8 is a view being taken on the plane of the line F—F of FIG. 1.

FIG. 8 is a view being taken on the plane of the line F—F of FIG. 1. The bypass bus 33 having the bypass disconnecting switch 32 is arranged above the gas insulated switchgear to connect the power receiving unit LU1 and the transformer-side unit TU1.

Figure 9:
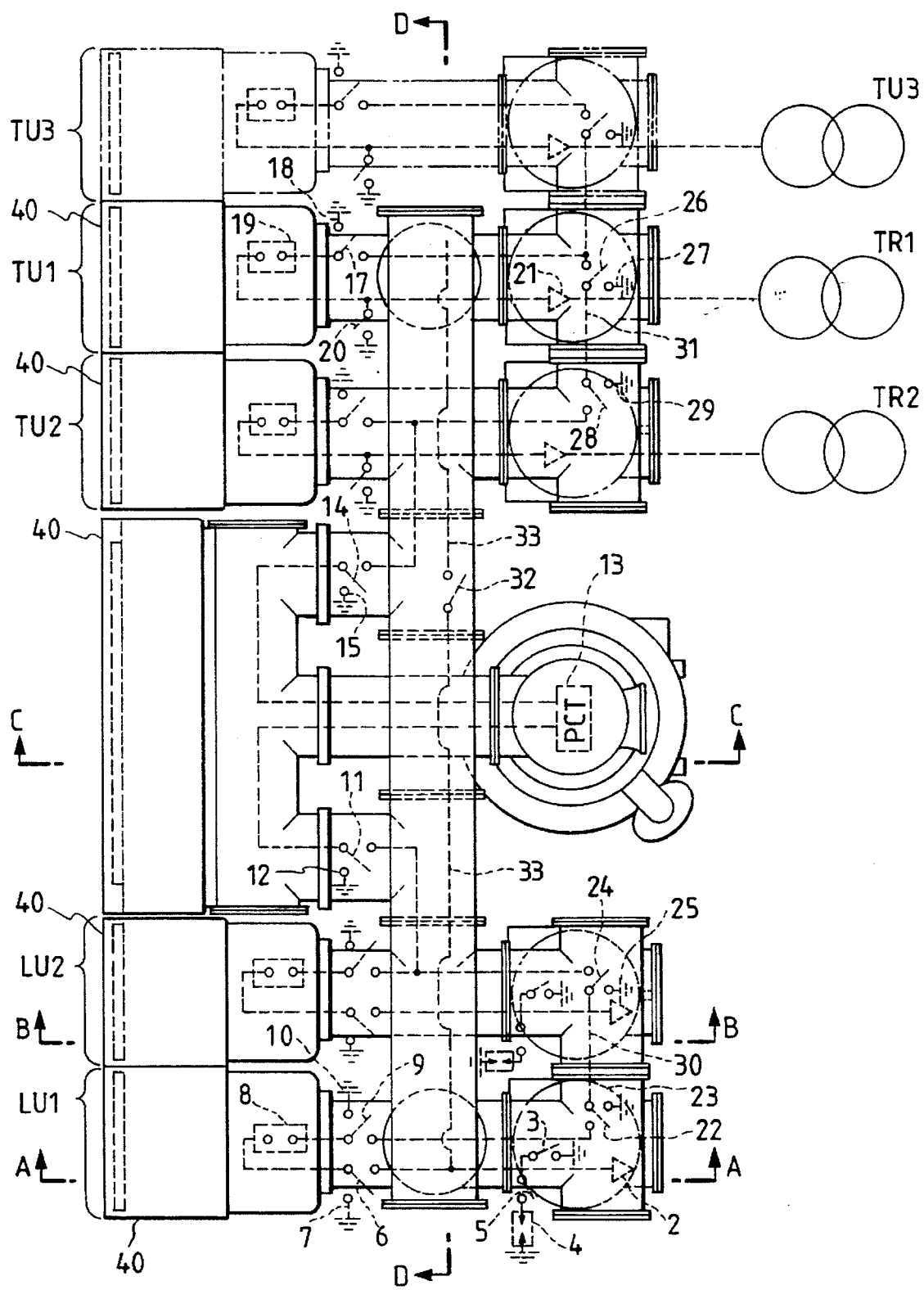
FIG. 9 is a plan view showing the gas insulated switchgear of FIG. 1 to which a bank is added.

As described in the embodiment according to the present invention shown in FIG. 1, it can be understood that the size of the gas insulated switchgear is substantially decreased by arranging the power receiving units in one side of the instrument potential/current transformer unit and the transformer-side units in the other side, and arranging the bypass bus connecting the power receiving units and the transformer-side units in parallel to the direction of the row of cubicles. FIG. 9 is a plan view showing the gas insulated switchgear of FIG. 1 to which a bank is added. Addition of a bank can be performed only by connecting an added transformer-side unit TU3 equivalent to the existing transformer-side unit TU1 except connected to the bypass bus 33 to the outside of the existing transformer-side unit TU1. Work for adding a bank can be decreased and increase in the size of the gas insulated switchgear due to adding a bank can be suppressed.

Figure 10:
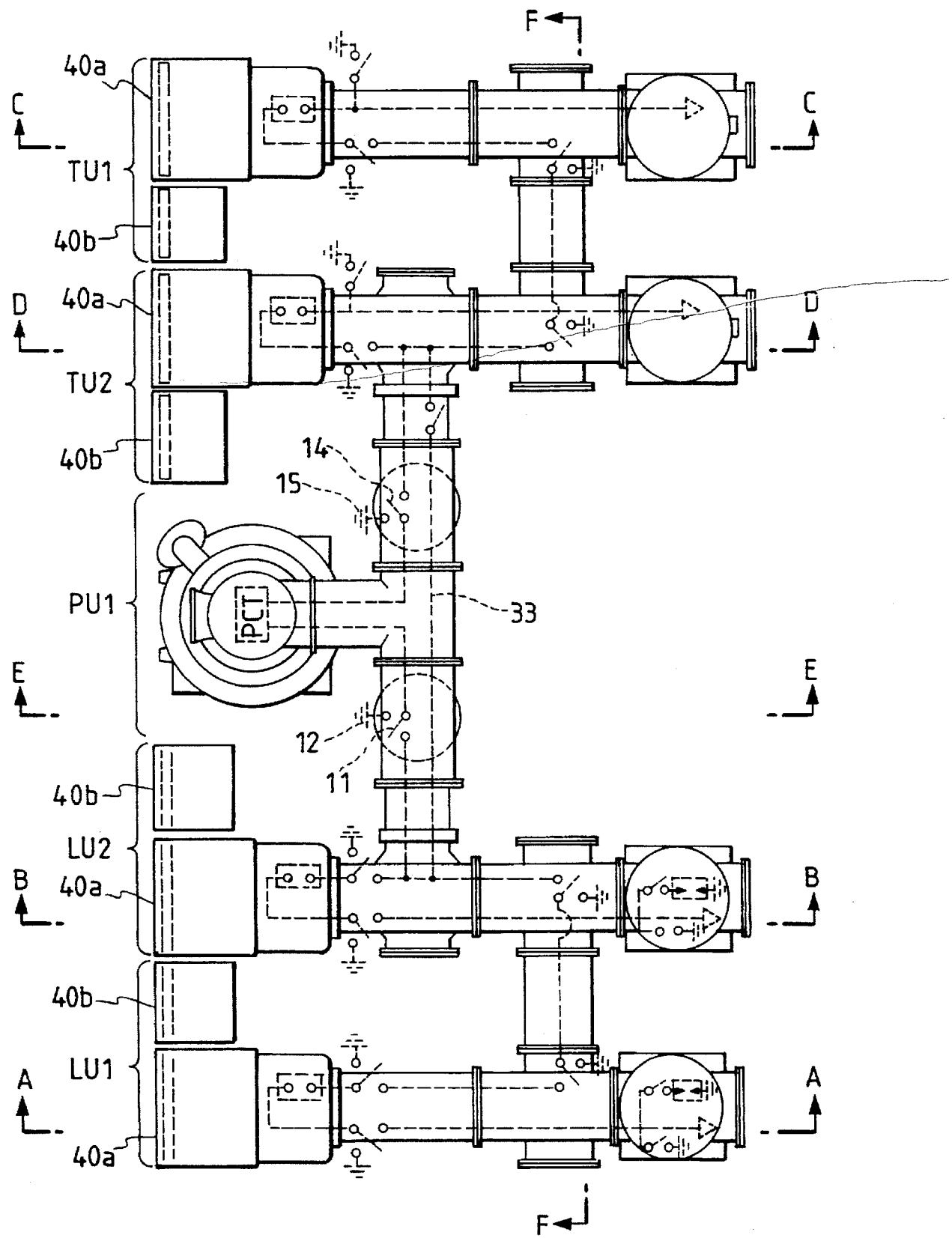
FIG. 10 is a plan view showing an embodiment of a gas insulated switchgear in accordance with the present invention.

FIG. 10 is a plan view showing another embodiment of a gas insulated switchgear shown in the single-line circuit diagram of FIG. 2 in accordance with the present invention. Similar to FIG. 1, the power receiving units LU1, LU2 are placed in one side of the instrument potential/current unit PU1 and the transformer-side units TU1, TU2 are placed in the opposite side, and the bypass bus 33 is arranged in the lower stage of the gas insulated switchgear in parallel to the direction of the row of cubicles to connect the power receiving unit LU2 and the transformer-side unit TU2. Further, in the embodiment of FIG. 10, each of the cubicles containing the power receiving units LU1, LU2 and the transformer-side units TU1, TU2 is divided into an operating console 40a containing an operating device for various kinds of components in the gas insulated switchgear and a control console 40b containing a control circuit for various kinds of components in the gas insulated switchgear, and the operating console 40a and the control console 40b are arranged adjacent to each other in the direction of the bank.

Figure 11:
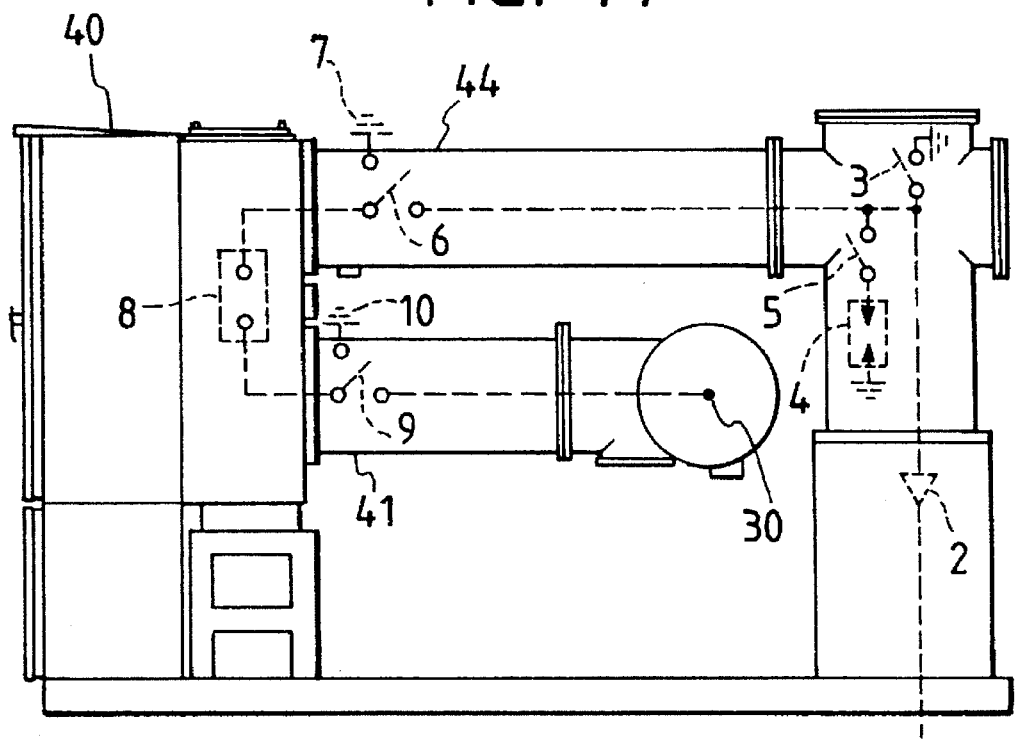
FIG. 11 is a view being taken on the plane of the line A—A of FIG. 10.
Figure 12:
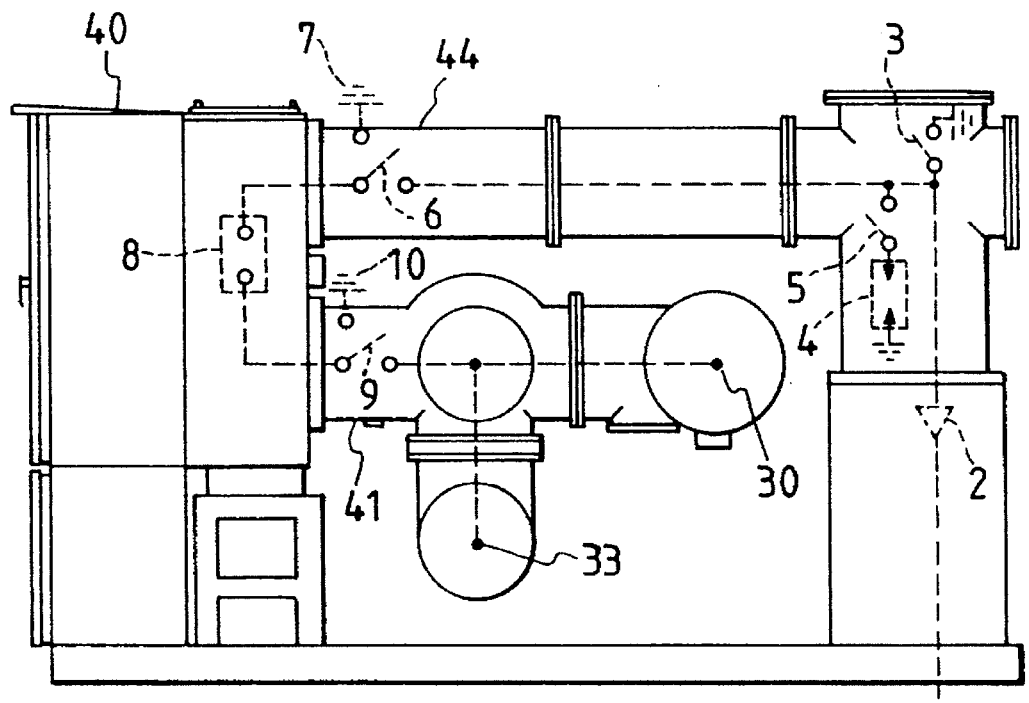
FIG. 12 is a view being taken on the plane of the line B—B of FIG. 10.

FIG. 11 and FIG. 12 are side views showing the power receiving units LU1 and LU2 being taken on the plane of the lines A—A and B—B of FIG. 10, respectively. A set of lead terminals 41, 42, upper and lower terminals, are provided in the opposite side of a cubicle for the disconnecting switch 8 placed in the back of a cubicle 40, and the lead terminal 41 provided lower side is connected to the connecting conductor 30 which is connected between the both power receiving units LU1, LU2 through the disconnecting switch 9 having the earthing switch 10. The lead terminal 42 provided upper side is connected to the disconnecting switch 6 with the earthing switch 7, the arrester 4 with the arrester isolating switch 5 and the cable head 2 through the earthing switch 3. The bypass bus 33 is arranged below the power receiving unit LU2 as shown in FIG. 12, and the lead terminal 41 in the lower side and the bypass bus 33 are connected.

Figure 13:
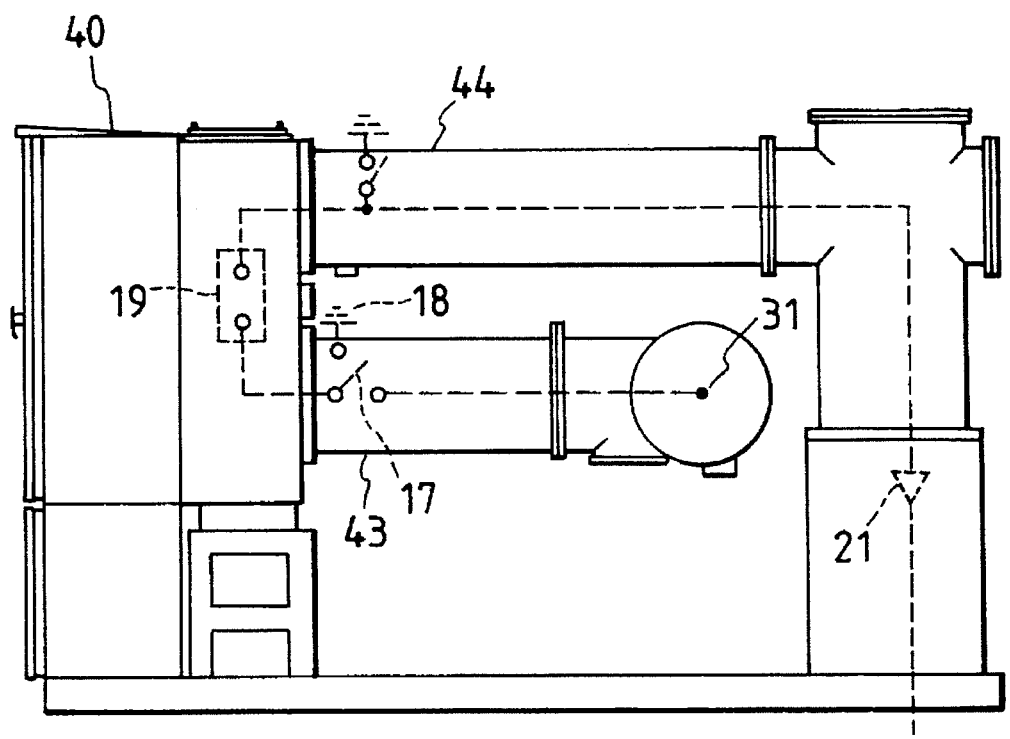
FIG. 13 is a view being taken on the plane of the line C—C of FIG. 10.
Figure 14:
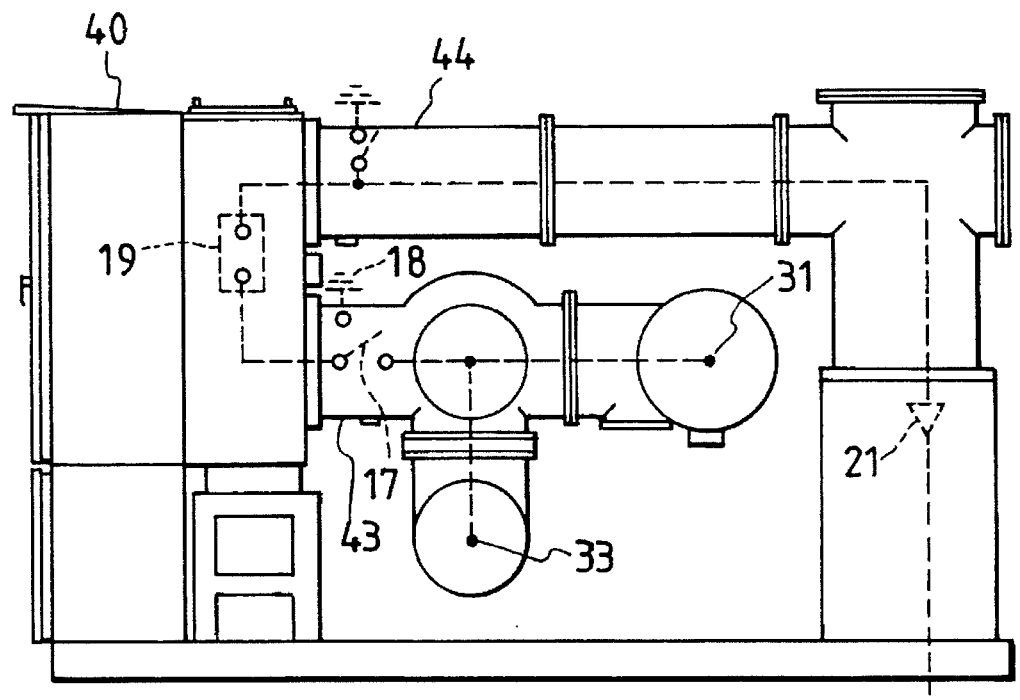
FIG. 14 is a view being taken on the plane of the line D—D of FIG. 10.

FIG. 13 and FIG. 14 are side views showing the transformer-side units TU1, TU2 being taken on the plane of the lines C—C and D—D of FIG. 10, respectively. A set of lead terminals 43, 44, upper and lower terminals, are provided in the opposite side of a cubicle for the disconnecting switch 19 placed in the back of a cubicle 40, and the lead terminal 43 provided lower side is connected to the connecting conductor 31 which is connected between both transformer-side units TU1, TU2 through the disconnecting switch 17 having the earthing switch 18. The lead terminal 44 provided upper side is connected to the cable head 21 through the earthing switch 20. The bypass bus 33 is arranged below the both transformer-side unit TU2 as shown in FIG. 14, and the lead terminal 43 in lower side and the bypass bus 33 are connected.

Figure 15:
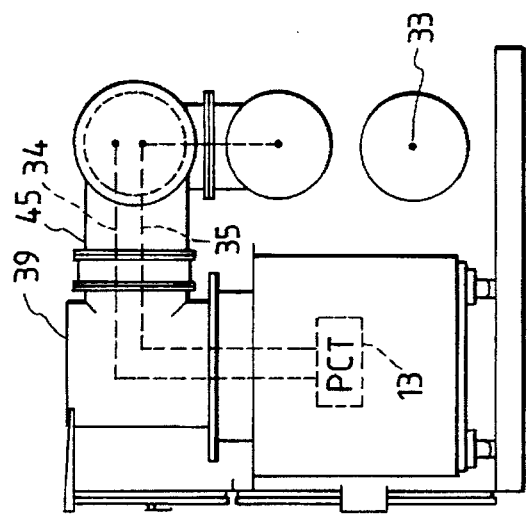
FIG. 15 is a view being taken on the plane of the line E—E of FIG. 10.

FIG. 15 is a side view showing the instrument potential/current transformer unit PU1 being taken on the plane of the line E—E of FIG. 10. The instrument potential/current transformer 13 is provided with a lead terminal 45 in the opposite side of the cubicles through an adapter 39, and connected to the disconnecting switch 11 with the earthing switch 12 and the disconnecting switch 14 with the earthing switch 15 through the connecting conductors 34 and 35 respectively. The bypass bus 33 is arranged below the instrument potential/current transformer unit PU1.

Figure 16:
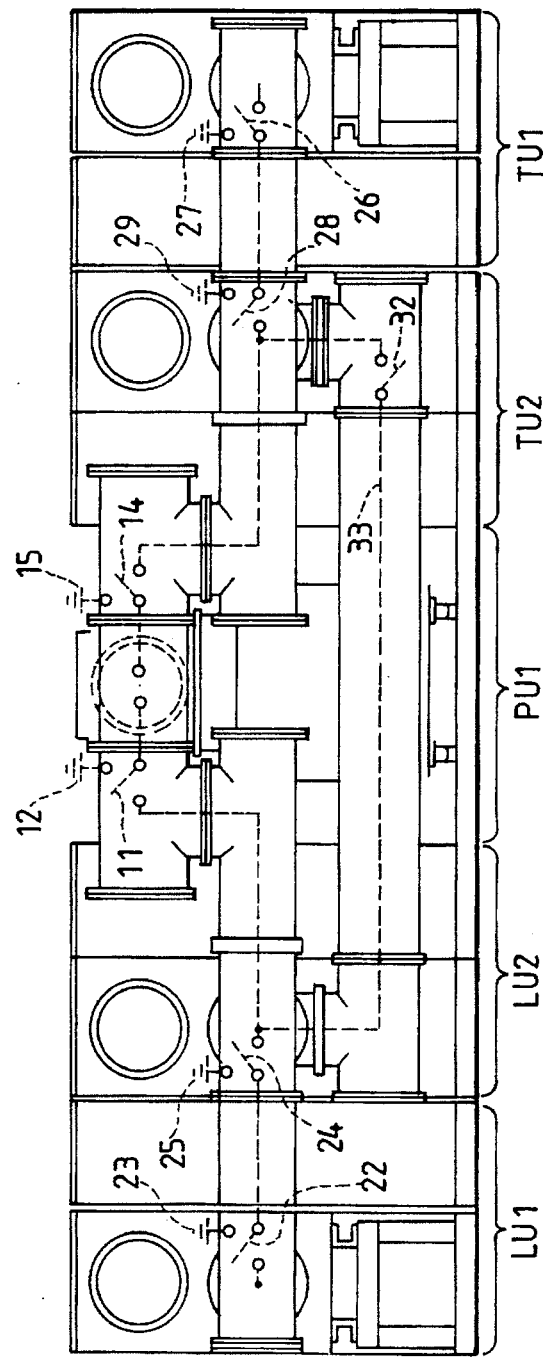
FIG. 16 is a view being taken on the plane of the line F—F of FIG. 10.

FIG. 16 is a view being taken on the plane of the line F—F of FIG. 10. The bypass bus 33 having the bypass disconnecting switch 32 is arranged below the gas insulated switchgear to connect the power receiving unit LU2 and the transformer-side unit TU2.

From the embodiment according to the present invention shown in FIG. 10 described above, it can be understood that the size of the gas insulated switchgear is substantially decreased by arranging the power receiving units in one side of the instrument potential/current transformer unit and the transformer-side units in the other side, and arranging the bypass bus connecting the power receiving units and the transformer-side units in parallel to the direction of the row of cubicles. In a case of adding a bank, similar to the case of FIG. 1, addition of a bank can be performed only by connecting an added transformer-side unit TU3 equivalent to the existing transformer-side unit TU1 to the outside of the existing transformer-side unit TU1. Further, the height of the gas insulated switchgear can be suppressed by dividing each of the cubicles containing each of the power receiving units and the transformer-side units into an operating console and a control console and arranging the operating console and the control console adjacent to each other in the direction of the row.

As having been described above, according to the present invention, it can be understood that the work for adding a bank as well as the installation area of the gas insulated switchgear is substantially decreased by arranging the power receiving units in one side of the instrument potential/current transformer unit and the transformer-side units in the other side, and arranging the bypass bus connecting the power receiving units and the transformer-side units in parallel to the direction of the row of cubicles. Further, the height of the gas insulated switchgear can be suppressed by dividing each of the cubicles containing each of the power receiving units and the transformer-side units into an operating console and a control console and arranging the operating console and the control console adjacent to each other in the direction of the row.

We claim:

1. A gas insulated switchgear equipment having an instrument potential/current transformer unit, a plurality of power receiving units, a plurality of transformer-side units and buses connecting among said units, said units each constructed in a row of cubicles in front of said gas insulated switchgear equipment, wherein at least two of said power receiving units are arranged on one side of said instrument potential/current transformer unit and at least two of said transformer-side units are arranged on the other side of said instrument potential/current transformer unit;

one of said at least two power receiving and one of said at least two transformer-side units being connected with a bypass bus arranged in parallel to said row of cubicles through a bypass disconnecting switch; and the other of said at least two power receiving units and the other of said at least two transformer-side units being connected with said bypass bus through said instrument potential/current transformer unit.

2. A gas insulated switchgear equipment according to claim 1, wherein said bypass bus is arranged in an upper stage of said insulated switchgear equipment.

3. A gas insulated switchgear equipment according to claim 1, wherein said bypass bus is arranged in a lower stage of said gas insulated switchgear equipment.

4. A gas insulated switchgear equipment according to claim 1, wherein each of said cubicles is divided into a first cubicle having an operating console containing an operating device for various kinds of components in the gas insulated switchgear equipment and a second cubicle having an operation console containing a control circuit for various kinds of components in the gas insulated switchgear, each of said first and second cubicles being arranged adjacent to each other in a direction of said row of cubicles.

5. A gas insulated switchgear equipment according to claim 1, wherein a plurality of disconnecting switches provided in said bus connecting between said units are each arranged in a terminal portion of each of said transformer-side units and between each of said transformer-side units and each of the corresponding transformers.

* * * * *